United States Patent [19]

Zimmermann nee Ignácz et al.

[11] 4,042,719

[45] Aug. 16, 1977

[54] COMPOSITIONS OF LOW CALORY CONTENT

[75] Inventors: Zsuzsanna Zimmermann nee Ignácz; Robert Gépész, both of Budapest, Hungary

[73] Assignee: Chinoin Gyogyszer es Vegyeszeti Termekek Gyara RT, Budapest, Hungary

[21] Appl. No.: 613,796

[22] Filed: Sept. 16, 1975

Related U.S. Application Data

[63] Continuation of Ser. No. 335,714, Feb. 26, 1973, abandoned.

[30] Foreign Application Priority Data

Feb. 25, 1972 Hungary .................................. ZI 167
Feb. 9, 1973 Hungary .................................. CI 1340

[51] Int. Cl.$^2$ .............................................. A23L 1/04
[52] U.S. Cl. ..................... 426/573; 426/456; 426/804; 426/72; 426/658
[58] Field of Search ............... 426/72, 311, 103, 573, 426/804, 456

[56] References Cited

U.S. PATENT DOCUMENTS

| 3,023,104 | 2/1962 | Battista | 426/804 |
| 3,097,947 | 7/1963 | Kemmerer | 426/63 |
| 3,574,634 | 4/1971 | Singer | 426/804 |
| 3,676,150 | 7/1972 | Glicksman | 426/804 |
| 3,769,404 | 10/1973 | Latham | 426/614 |

OTHER PUBLICATIONS

Bender, A. E., Dietetic Foods, Chem. Pub. Co., 1967, New York, pp. 85-93 and 123-125.

*Primary Examiner*—Jeanette M. Hunter
*Attorney, Agent, or Firm*—Karl F. Ross; Herbert Dubno

[57] ABSTRACT

A low-calory comestible made by preswelling an edible carbohydrate component, e.g. flour, and a cellulose ether which has a viscosity of 1000 to 3000 centiporse in a 20% solution at 20° C. and subsequently drying the preswollen mixture. The resulting product has a high palatability even with long shelflife and is highly filling while contributing few calories upon ingestion.

5 Claims, No Drawings

COMPOSITIONS OF LOW CALORY CONTENT

BACKGROUND OF THE INVENTION

This is a continuation of application Ser. No. 335,714, filed Feb. 26, 1973, now abandoned.

It is known that excessive intake of food and overweight constitutes a serious health problem. Calory intake above the individual needs as a result of the excessive consumption of carbohydrates damage the heart and the circulatory system, particularly in the case of aged persons, pregnant women and people suffering from diabetes. Recently the use of appetite-reducing medicaments has become widespread, however, the said drugs act as stimulants of the central nervous system and, therefore, the continuous administration thereof leads to serious damages of the central nervous system and also to habituation.

Recently a number of attempts have been made to solve this problem by the administration of compositions containing indigestible substances. The use of these compositions leads to the feeling of fullness without causing weight increase. The following additives have been suggested: casein (British Pat. No. 990.523), mixtures of egg-albumin, casein, cellulose-ether, guar gum, agar pectin, carrageen and sodium alginate (British Pat. No. 993.308), guar gum (British Pat. No. 1,041,600 and 1,106,882), a mixture of soluble polyglucose citrate and insoluble polyglucose (British Pat. No. 1,182,961), microcrystalline cellulose (U.S. Pat. No. 3,023,104), a mixture of 50% of glutin flour, 1-10% of vegetable gums and 50% of microcrystalline cellulose, peanut-shell or wood-flour (U.S. Pat. No. 3,023,104), edible cheese (DAS No. 1,442,021), 5-30% of finely dispersed pure cellulose (DAS No. 1,959,196). Special dry cakes for diabetic people have also been described, prepared from 100% of soya flour and 30-50% of proteine (DAS NO. 2,060,797 ). None of the above products meets in a satisfactory manner the requirements of pleasant and permanent consumption, good taste and easy absorption from the intestinal tract.

SUMMARY OF THE INVENTION

According to the present invention there is provided a process for the preparation of a composition having a pleasant taste and a low caloric value, which comprises admixing and swelling a natural digestible carbohydrate, with a cellulose ether in the presence of water and drying the gel thus obtained.

The following natural digestible carbohydrate sources may be preferably used in the process of the present invention: cereals, e.g. wheat, rye, oats, millet, barley, rice, maize, Indian corn; leguminous plants, e.g. pea, bean, lentils; tuber- and root-crops, e.g. potato, manioca-root, Jerusalem artichoke, sweet potato (batate); shelled crops, such as nuts, of the almond, hazelnut, peanut, chestnut type or carbohydrates isolated therefrom (e.g. pectines). Mixtures of the above digestible carbohydrate-containing substances may be used as well.

As cellulose ethers it is preferred to use products, which have a "medium" viscosity, i.e. a 2% aqueous solution thereof has a viscosity of 1000-3000 centipoise when measured at 20° C in a Hoppler-viscosimeter. By appropriate modifications of the technology and depending on the properties of the carbohydrate-delivering substances, cellulose ethers having a lower or higher viscosity may be used as well.

The term "cellulose ether" used throughout the specification encompasses all types of cellulose ethers, which are innocuous to health, remain substantially unabsorbed by the organism and are not subject to decomposition leading to the formation of molecules, which are detrimental to health. For this purpose e.g. aliphatic ethers of cellulose may be used, such as the methyl ether, ethyl ether, mixed and substituted ethers, hydroxypropylmethylether, methylhydroxyethylether, carboxymethylether, hydroxymethylether and mixtures of the said ethers.

According to an embodiment of the process of the present invention the carbohydrate component on the one hand, and the cellulose ether on the other are admixed with water (prior to the admixture with each other) optionally in the presence of further components and additives, and allowed to swell. The two diluted gels or suspensions thus obtained are admixed then with each other, whereby further swelling takes place. According to another embodiment of the process the carbohydrate component is admixed with the cellulose ether and the mixture thus obtained is treated with water.

Preferably the carbohydrate component to preparatory operations depending on the further steps of processing and the character of the substance. Thus particles and grains having a larger particle size may be disintegrated or ground (e.g. cereals); other substances may be heated to boiling, cooked or treated with vapour (e.g. potato). Certain substances may be preferably hulled or shelled in a dried or humid state. The hulls and shells of the grains may inhibit and slow down the process of swelling.

The main feature of the present invention is the common swelling of the carbohydrate component and the cellulose ether in water. This step is carried out preferably at a temperature of 20°-40° C under homgenous admixture of the materials. The said admixture is effected by means of stirring or kneading and depends on the consistence of the admixed substances. Small amounts of the substances, as a paste-like mass may be subjected to hand-kneading, while on industrial scale stirring machines, kneading machines or other apparatuses are used, which are generally applied in the food-industry for the processing of the farinaceous products. If desired, the mass thus obtained may be further processed in an edge mill. Layers of cake may be prepared by adjusting the thickness of the paste-like mass to the desired value between cylinders and cutting the same to pieces. Other forms may be obtained with the aid of hydraulic pressing machines.

The ratio of the cellulose ether and the carbohydrate-content of the foodstuff — subjected to common swelling with the cellulose ether — may be preferably 1:0 to 1:12 .

The swollen state of the mixture is eliminated by drying the product. Drying may be carried out a different temperatures depending on the properties of the carbohydrate component and also on those of the eventual further additives (e.g. flavoring agents, coloring agents and vitamine-containing additives, etc.). One may proceed by using drying temperatures of 100°-300° C; in this case the operation is similar to the baking of farinaceous products. Drying at a low temperature provides a mild treatment of the starting materials and the eventual additives. Drying may also be effected under reduced pressure. Prior to drying the product may be brought into any desired form.

The products obtained after drying may be cut into pieces. This product is already suitable for the preparation of foodstuffs having a low caloric value. The products can also be disintegrated and mixed with other foodstuffs. One may also proceed by grinding the product and using the same as starting material for the preparation of various foodstuffs in the form of flour to be used in the production of vegetables, soups, pudding, drinks or a basic material in the manufacture of cakes. The products prepared according to the present invention may be readily used in the production of roux, pie-pastes, cheeses, filled butcher's meat and other products, dried cakes, creams filled in tubes and other similar food-products. Wafer and biscuit of outstanding quality may be prepared by replacing a portion of the flour used by a corresponding amount of methyl cellulose.

The product obtained after drying constitutes a new colloidol system. The swelling velocity of the said system may be readily compared to that of the components used. It is of considerable importance that the swelling velocity and the new product is significantly lower, than that of pure cellulose ether. This property occurs both in acidic and in weak alkaline medium.

The above advantageous property leads to the preferable biological effects of the new products: it results in the elimination of the disgusting feeling in the mouth, it causes a permanent feeling of fullness in the stomach and the good adaptibility of the product is probably responsible for its ready removability from the intestinal tract.

A number of various additives can be added to the products of the present invention. The choice of the additives depends to a large extent on the field of application and the starting material used. In order to make the product still enjoyable both the appearance and the taste thereof can be modified. A large number of inert and permitted coloring agents can be added. Meat extracts, salt, sweet stuffs, dried vegtables and spices, vanilla, cacao, pepper, paprika, etc., may be added.

It is often advisable to add preservatives e.g., sodium benzoate.

A very important class of additives consists of compounds added for the purpose of prophylaxis or treatment of nutrimental deprivation diseases, which readily occur when artificial diets are used.

In order to keep the vitamin content of the organism at the desired level, various water- and lipid soluble vitamins additives such as are of particular importance /e.g. Vitamin A, $B_1$, $B_2$, $B_6$, C, D, E/. As further additives such as salts being indispensable for the organism can be mention (such as iron, magnesium, calcium salts, etc.), which may be used in the form of phosphates or various complexes.

The additives may be added in various phases of the process according to the present invention. The particular method chosen depends on the heat- and water-resistance and the physical-chemical properties of the additives.

Water-soluble biologically active (diet enriching) additives preferably added before swelling to the gel of the cellulose ether in the form of an aqueous solution. One may also proceed by adding a suspension of the additive. According to a further embodiment of the present invention the dissolution of the additive is promoted by the use of further solvents. This method is applicable in the first place when lipid-soluble vitamins and other (diet-enriching) biologically active additives are incorporated.

According to a still further embodiment of the process the additives are added to the mixture after swelling.

If biologically active additives or taste-improving or coloring agents being sensitive to heat are used, the product must be dried under particularly mild conditions. Vitamins and other additives being particularly sensitive to higher temperatures are preferably applied to or incorporated into the dried product by means of impregnation, coating, immersion or spraying.

A particular advantage of the process is that it is suitable for the simultaneous administration of diet-enriching-additives which are incompatible with each other, in a very similar manner. For this purpose the additives immiscible with each other are incorporated into separately prepared and dried layers. The layers thus treated can be combined or sticked into readily palatable biscuits. Thus Vitamin C and iron-compositions may be consumed in a snack; the foodstuff has a good taste, it creates a feeling of fullness and the carbohydrate consumption is reduced. The product of the present invention containing biologically active materials may be readily used for the maintenance of body weight of healthy people, sportsmen, and pregnant women.

The scope of the products according to the present invention may be significantly extended by the incorporation of further diet-enriching additives. As a specific field of application ill and convalescent patients and persons, who are difficult to be disciplined (children, aged persons) may preferably receive products of the present invention containing mild analgetic and sedative agents. The said drugs and e.g. antiseptic agents are also preferred in the case of patients suffering from ulcers. By the preparation of compositions intended for diabetic patients the diet having a low carbohydrate content may be completed with antidiabetic drugs.

EXAMPLES

EXAMPLE 1

40 g of wheat flour and 20 ml of methyl cellulose are kneaded in 80 ml of water at 30° C to give a homogenous pulp and after standing for an hour the paste-like swollen product is baked at a temperature of 120° to 130° C for half an hour. After baking the moisture content amounts to 6.2%. The baked cake is disintegrated and ground to flour fineness.

EXAMPLE 2

A mixture of 20 g of wheat flour, 20 g of rye-flour and 60 g of methyl cellulose is kneaded with 100 ml of water for an hour to a hard pulp, which is dried at 80° C and ground to a flour. The moisture content of the grist thus obtained is 8.5%.

EXAMPLE 3

A mixture of 50 g of maize flour, 10 g aleurone flour and 20 g of cellulose carboxymethyl ether is swollen in 50 ml of water at room temperature for 30 minutes, whereupon it is dried at 70° C and ground to flour fineness. The moisture content of the grist mounts to 9.6%.

EXAMPLE 4

4 g of the grist prepared according to Example 1 are toasted in 6 ml of edible oil to give a roux. This product can be readily used for the preparation of fresh soups and vegetables and also as roux for tinned (preserved) vegetables.

EXAMPLE 5

80 g of the grist prepared according to Example 3 and 50 g of full-egg are kneaded with water used in such an amount to give a paste having the desired consistency. The paste is brought into the desired form and dried and treated further as a cake.

EXAMPLE 6

5 g of cacao powder, 8 g of the grist prepared according to Example 2, 7.5 g of edible gelatin, 1 g of sodium cyclamate or 1 g of saccharin and 20 g skimmed milk powder are uniformly mixed. The pudding is prepared by suspending the said mixture in 250 ml of water and pouring the suspension into 250 ml of boiling water. The mixture is heated to boiling, then it is cooled and poured into the desired form (mould). It congeals into a jelly-like mass. In the place of cacao powder any flavoring agent can be used.

EXAMPLE 7

200 g of cheese are heated and to the molt formed a total amount of 25 g of the grist according to the Example 2 swollen in 100 ml of water are added in portions at 60° C. The cheese-mass thus obtained is formed untilwarm.

EXAMPLE 8

To a pie paste prepared according to any known method 15% of the grist obtained according to Example 2 are added and the mass is brought into the desired form. As a further protein supplement 15-20 by weight of soya-flour or edible caseine can be added to the paste.

EXAMPLE 9

To a cheese(-paste), ham(-paste) or sausage(-paste) according to known methods 20–50% by weight of the grist prepared according to Example 2 are added and the mass thus obtained is filled into tubes.

EXAMPLE 10

To a meat stuffing and filling prepared according to known methods 12% by weight of the grist prepared according to Example 2 are added.

EXAMPLE 11

To a mixture of 40 g of wheat flour, 20 g of grated cheese, 16 g of margarine, 1 g of salt and 1 g of caraway seed 20 g of methyl cellulose swollen in 70 ml of skimmed milk are added, the mixture is kneaded to a paste and baked in a waffle-iron for an hour. In the place of cheese and caraway seed any other flavoring agent may be used as well.

EXAMPLE 12

A mixture of 40 g biscuit flour, 20 g of methyl cellulose, 15 g of margarine, 5 g of sugar and 1.5 g of ammonium carbonate is kneaded with water to give a paste. As flavoring agent e.g. salt or vanillin is added to the mixture. After forming the paste is baked in the usual manner.

EXAMPLE 13

50 g of rye flour, 10 g of gluten flour and 50 g of methyl cellulose are treated with 100 ml of water at 20° C to give a paste which is allowed to stand for 2 hours. The mass is dried in vacuo at 70° C and ground. The water content of the product amounts to 4.7 %.

EXAMPLE 14

40 g of finely ground oat-flour, 10 g of pea-flour, 10 g of wheat flour and 30 g methyl cellulose are swollen in 70 ml water and the mass thus obtained in dried at 60° C for 2 hours. The dry product is ground in a Perplexmill. The water content of the product thus obtained amounts to 9.8 %.

EXAMPLE 15

120 g of potato flour and 80 g of methyl cellulose are treated with 160 ml of water to give a thick paste. The mass is allowed to swell at 35° C for about 2 hours. The highly viscous paste is dried under reduced pressure at 60° C and desintegrated. The product thus obtained is particularly suitable for the preparation of cream-like products (e.g. for the enrichment of sausage filling, cheeses etc.)

EXAMPLE 16

40 kg of wheat flour, 20 kg of processed cheese, 3 kg of margarine and 50 g of iron dextran (iron content 20%) are admixed and after addition of 60 liters of milk stirred at 20° C. 10 kg of methyl cellulose are added under stirring and the mixture is allowed to swell for an hour under homogenization. The swollen mass is diluted with 80 l of milk, whereupon the thin-liquid gel thus obtained is dried for a minute at a temperature of 130°–160° C in a waffle-iron apparatus, between heated plates.

To 50 kg of melt margarine 1.5 g of vitamin A and 12 mg of vitamin $D_2$ are added. It is important to achieve a thorough homogenisation. 10 kg of the ground product prepared according to Example 1 are allowed to swell in 100 kg of sweet cream, whereupon 2 g of vitamin $B_1$, 2 g of lactoflavine, 20 g nicotinic acid, 100 g of ascorbic acid and 60 g of dicalcium phosphate are added. The gel thus obtained is added to the melt margarine under vigorous stirring whereupon stirring is continued until the mass cools. The cream thus obtained is filled — if desired after addition of cacao powder and sweet stuff — between the plates of a waffle iron and the plates thus formed are cut by known methods. The wafers prepared according to this Example are particularly suitable for consumption by sportsman.

EXAMPLE 17

60 kg of rye flour, and 40 kg of methyl cellulose (viscosity 1500 certipose at 20° C) are allowed to swell in 30 l of water at 20° C. The gel thus obtained is admixed with 20 g of nicotinic acid, 2 g of thiamine, 2 g of lactoflavine, 100 g of ascorbic acid and 60 g of dicalcium phosphate. After 20 minutes the paste is dried at 40° C in vacuo. The product thus obtained is ground to fine flour.

The product thus obtained can be added in an amount of 10–50% to creams, sausages and cheeses.

EXAMPLE 18

1.5 kg of pectine and 12 kg of ethyl cellulose are allowed to swell in 3 l of water whereupon the gel thus obtained is dried at 60° C in vacuo until the water content decreases below 10%. The product thus obtained is ground.

The milled product thus obtaind is admixed with 50 kg of cored and peeled apricots, 20 kg of sorbitol, 0.5 kg of citric acid, 0.06 kg of sodium saccharine and 27 l of water under stirring the total weight of the product obtained is 100 kg. The product may be consumed in the form of the well known fruit jam.

What we claim is:

1. A process for the preparation of a nutriment having a low caloric value and adapted, upon ingestion, to be highly filling to the eater, said process comprising the steps of:
  a. combining an edible-carbohydrate component and a cellulose ether in a ratio by weight of substantially 0.1 to 12:1;
  b. swelling the carbohydrate component and cellulose ether in water to form a swelled composition; and
  c. drying the swelled composition, said cellulose ether being selected from the group which consists of methyl ethers, ethyl ethers, carboxy methyl ethers and hydroxy-substituted ethers of cellulose and mixtures thereof, the cellulose ether having a viscosity of 1000 to 3000 centipoise in a 2% aqueous solution at 20° C, said carbohydrate component and said cellulose ether being swelled in the presence of water in step (b) at a temperature of 20° to 40° C, the swelled mixture being dried at a temperature up to about 300° C.

2. The process defined in claim 1 wherein said carbohydrate component and said cellulose ether are each individually swelled in water to form intermediate gels prior to step (a) the intermediate gels being mixed together in step (a) by kneading the cellulose ether with the carbohydrate components.

3. The process defined in claim 2 wherein said cellulose component includes at least one edible substance selected from the group which consists of cereals, legumes, tubers, root crop, shelled crop and mixtures thereof, the carbohydrate component being subjected to at least one treatment selected from the group which consists of peeling, hulling, disintegrating and grinding prior to use, the process further comprising disintegrating the dried product produced in step (c).

4. The process defined in claim 3 wherein step (c) is carried out under vacuum.

5. The process defined in claim 3 wherein step (c) is carried out at room temperature.

* * * * *